US008678803B2

(12) United States Patent
Jo et al.

(10) Patent No.: US 8,678,803 B2
(45) Date of Patent: Mar. 25, 2014

(54) APPARATUS FOR TAKING OUT MOLDED PRODUCT

(75) Inventors: Satoshi Jo, Kyoto (JP); Hidekazu Ito, Kyoto (JP)

(73) Assignee: Yushin Precision Equipment Co., Ltd., Kyoto (JP)

( * ) Notice: Subject to any disclaimer, the term of this patent is extended or adjusted under 35 U.S.C. 154(b) by 113 days.

(21) Appl. No.: 13/537,159

(22) Filed: Jun. 29, 2012

(65) Prior Publication Data

US 2013/0004609 A1 Jan. 3, 2013

(30) Foreign Application Priority Data

Jun. 30, 2011 (JP) ................................. 2011-146116

(51) Int. Cl.
*B29C 45/40* (2006.01)
*B29C 45/76* (2006.01)
B29C 33/44 (2006.01)
B29C 47/92 (2006.01)
B28B 17/00 (2006.01)

(52) U.S. Cl.
CPC ............. *B29C 45/76* (2013.01); *B29C 45/7626* (2013.01); *B29C 33/442* (2013.01); *B29C 47/92* (2013.01); *B28B 17/0063* (2013.01)
USPC ............ 425/139; 425/155; 425/165; 700/197

(58) Field of Classification Search
CPC .. B29C 47/92; B29C 33/442; B29C 37/0003; B29C 2945/76498; B29C 45/40; B29C 49/70; B29C 45/82; B29C 45/7626; B29C 33/42; B28B 17/0063
USPC .................... 425/139, 155, 165; 700/197, 204
See application file for complete search history.

(56) References Cited

U.S. PATENT DOCUMENTS

| | | | | |
|---|---|---|---|---|
| 4,208,176 A | * | 6/1980 | Salerno | 425/139 |
| 4,839,819 A | * | 6/1989 | Begin et al. | 702/62 |
| 5,792,483 A | * | 8/1998 | Siegrist et al. | 425/135 |
| 5,911,924 A | * | 6/1999 | Siegrist et al. | 264/40.1 |
| 6,315,543 B1 | * | 11/2001 | Lausenhammer et al. | 425/139 |
| 6,511,618 B1 | * | 1/2003 | Seki | 264/40.1 |
| 6,526,360 B1 | * | 2/2003 | Ito et al. | 702/60 |
| 6,902,386 B2 | * | 6/2005 | Uchiyama et al. | 425/139 |
| 7,425,123 B2 | * | 9/2008 | Reinhardt | 425/150 |
| 7,519,450 B2 | * | 4/2009 | Yamaura et al. | 700/200 |
| 8,002,532 B2 | * | 8/2011 | Stirn et al. | 425/139 |

(Continued)

FOREIGN PATENT DOCUMENTS

JP        2009-292066 A        12/2009

*Primary Examiner* — Yogendra Gupta
*Assistant Examiner* — Emmanuel S Luk
(74) *Attorney, Agent, or Firm* — Rankin, Hill & Clark LLP

(57) ABSTRACT

Provided herein is an apparatus for taking out a molded product that can inform a user of the air consumption and the electric power consumption matching the set conditions without using measuring devices and that allows the user to set conditions that reduces the total energy consumption. A consumption computing section computes an air consumption and an electric power consumption per one molding cycle based on conditions set for a plurality of air driven devices and conditions set for a plurality of electric devices input from a controller and individual air consumption information and individual electric power consumption information stored in a consumption information storage section. A display control section causes a display section to display the air consumption and the electric power consumption computed by the consumption computing section.

10 Claims, 10 Drawing Sheets

(56) References Cited

U.S. PATENT DOCUMENTS

| | | | |
|---|---|---|---|
| 8,040,097 B2* | 10/2011 | Iwashita et al. | 318/565 |
| 2003/0077348 A1* | 4/2003 | Morwald et al. | 425/139 |
| 2004/0012108 A1* | 1/2004 | Yoshioka | 264/40.1 |
| 2004/0256753 A1* | 12/2004 | Lamberton | 264/40.1 |
| 2005/0181088 A1* | 8/2005 | Uchiyama et al. | 425/139 |
| 2006/0129268 A1* | 6/2006 | Conner et al. | 700/174 |
| 2006/0131772 A1* | 6/2006 | Yamada | 264/40.1 |
| 2006/0145379 A1* | 7/2006 | Okazaki | 264/40.1 |
| 2006/0161291 A1* | 7/2006 | Ikeda et al. | 700/200 |
| 2006/0197247 A1* | 9/2006 | Speight | 264/40.1 |
| 2006/0233912 A1* | 10/2006 | Reinhardt | 425/595 |
| 2006/0247822 A1* | 11/2006 | Nishizawa et al. | 700/200 |
| 2008/0181978 A1* | 7/2008 | Ho | 425/139 |
| 2010/0109182 A1* | 5/2010 | Kudo et al. | 264/40.5 |
| 2010/0109183 A1* | 5/2010 | Kudo et al. | 264/40.5 |
| 2011/0001253 A1* | 1/2011 | Isozumi | 264/40.1 |

* cited by examiner

Fig.3

| AIR DEVICE | DRIVE SOURCE | ACCESSORY UNIT |
|---|---|---|
| SECOND MOVER 17a | AIR CYLINDER 1 | VALVE 1 |
| THIRD MOVER 19a | AIR CYLINDER 2 | VALVE 2 |
| ELEVATING SHAFT 17b | AIR CYLINDER 3 | VALVE 3 |
| ELEVATING SHAFT 19b | AIR CYLINDER 4 | VALVE 4 |
| RUNNER CHUCK 19c | AIR CYLINDER 5 | VALVE 5 |
| MOLDED PRODUCT SUCTIONING HEAD 17c | VACUUM GENERATING DEVICE | VALVE 6 |

*Fig. 4A*

| DRIVE SOURCE | INDIVIDUAL AIR CONSUMPTION |
|---|---|
| AIR CYLINDER 1 | 2 |
| AIR CYLINDER 2 | 4 |
| AIR CYLINDER 3 | 3 |
| AIR CYLINDER 4 | 6 |
| AIR CYLINDER 5 | 4 |
| ADDITIONAL AIR CYLINDER 6 | 5 |
| VACUUM GENERATING DEVICE | 2 |
| ADDITIONAL VACUUM GENERATING DEVICE | 4 |

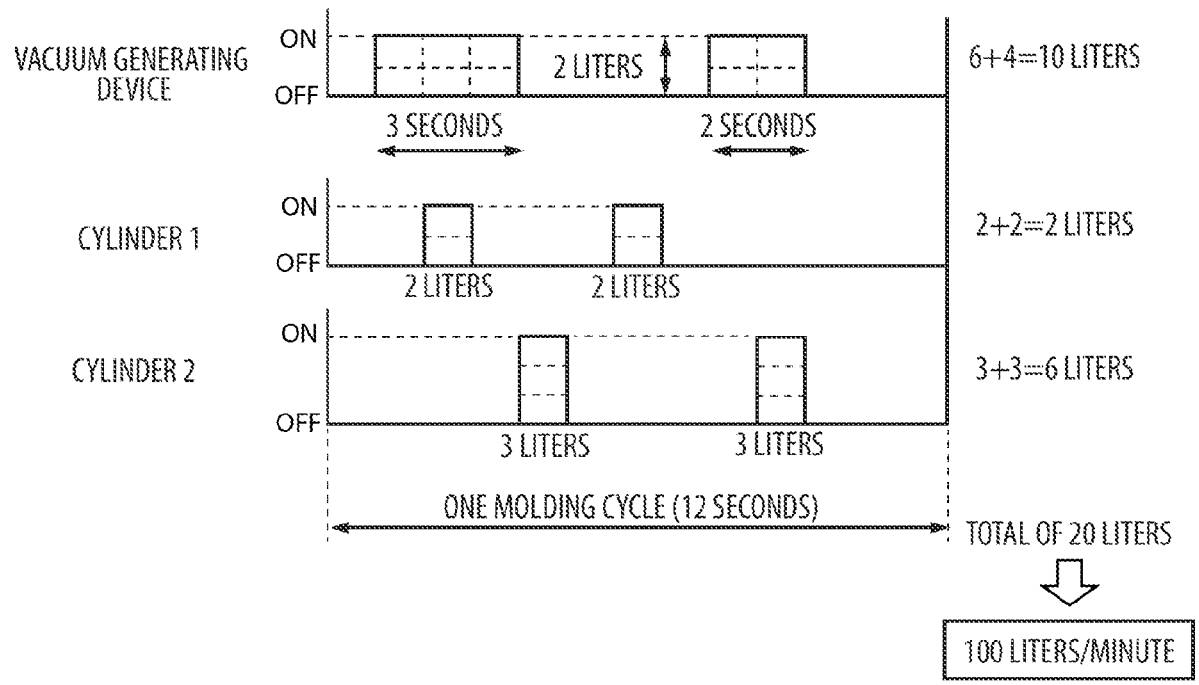

Fig. 6A

| ELECTRIC DEVICE | ADDITIONAL ELECTRIC POWER CONSUMPTION |
|---|---|
| BASIC ELECTRIC POWER CONSUMED WHEN ENERGIZED (TAKE-OUT APPARATUS POWERED ON) | Pbase |
| CONTROLLER BACKLIGHT TURNED ON | Pbk |
| VALVE 1 TURNED ON | Pv1 |
| VALVE 2 TURNED ON | Pv2 |
| VALVE 3 TURNED ON | Pv3 |
| VALVE 4 TURNED ON | Pv4 |
| VALVE 5 TURNED ON | Pv5 |
| VALVE 6 TURNED ON | Pv6 |
| VALVE 7 FOR ADDITIONAL CYLINDER TURNED ON | Pvad |

Fig.6C

| STATE | ELECTRIC POWER CONSUMPTION |
|---|---|
| FIRST STAND-BY STATE | Pwa |
| FIRST ACCELERATING STATE | Pac1 |
| FIRST CONSTANT-SPEED STATE | Pnr1 |
| FIRST DECELERATING STATE | Pac2 |
| SECOND STAND-BY STATE | Pwa |
| SECOND ACCELERATING STATE | Pac3 |
| SECOND CONSTANT-SPEED STATE | Pnr2 |
| SECOND DECELERATING STATE | Pacr |
| THIRD STAND-BY STATE | Pwa |

Fig.6D

| SPEED | Pac1 |
|---|---|
| v1 | Pac1-1 |
| v2 | Pac1-2 |
| v3 | Pac1-3 |
| v4 | Pac1-4 |
| · | · |
| · | · |
| · | · |
| vn | Pac1-n |

APPARATUS FOR TAKING OUT MOLDED PRODUCT

TECHNICAL FIELD

The present invention relates to an apparatus for taking out a molded product including a controller.

BACKGROUND OF THE INVENTION

It has recently been desired to reduce electric power consumed by various types of manufacturing apparatuses, including an apparatus for taking out a molded product. Japanese Patent Application Publication No. 2009-292066 (JP 2009-292066 A) discloses a conventional apparatus for taking out a molded product, including a controller that allows selection of one of a power-saving operation mode, in which the electric power consumption is reduced compared to the electric power consumption caused in a standard operation mode determined in advance, and a soft operation mode, in which vibration is reduced compared to the vibration caused in the standard operation mode. The apparatus for taking out a molded product also includes a plurality of air driven devices that suction and take out a molded product, besides electric devices such as motors that directly consume electric power.

However, the conventional apparatus for taking out a molded product does not allow a user to check how much electric power consumption has been reduced due to changed set conditions. In addition, the conventional apparatus for taking out a molded product does not allow the user to check the amount of air consumed by the plurality of air driven devices in use. Therefore, the user has not been able to know how to change the set conditions in order to reduce the total amount of energy consumed by the apparatus for taking out a molded product according to the molded product to be taken out. If it is attempted to positively reduce the energy consumption, it is necessary to consult with a person who maintains the apparatus for taking out a molded product to determine the set conditions each time the molded product to be taken out is changed. In the conventional apparatus, since the user has not been able to know the amount of consumed air corresponding to the set conditions, a compressor, in particular, must be operated at a capacity more than required if a plurality of apparatuses for taking out a molded product are used in a plant. The total energy consumption can be known by providing measuring devices such as a wattmeter and a flowmeter for each of the apparatuses for taking out a molded product. However, such a configuration is costly and requires the trouble of individually checking the indication of the various types of measuring devices.

SUMMARY OF THE INVENTION

An object of the present invention is to provide an apparatus for taking out a molded product that can inform a user of the air consumption and the electric power consumption corresponding to the set conditions without using measuring devices, and that allows the user himself/herself to set conditions that reduces the total energy consumption.

The present invention provides an apparatus for taking out a molded product, including: a plurality of air driven devices driven by air; a plurality of electric devices driven by electric power; and a controller including a display section and configured to set respective operating conditions of the devices of the apparatus. The apparatus according to the present invention further includes a consumption information storage section, a consumption computing section, and a display control section. The consumption information storage section stores individual air consumption information related to a relationship between the condition set for each of the plurality of air driven devices and the amount of air consumed by each of the plurality of air driven devices. The consumption information storage section also stores individual electric power consumption information related to a relationship between the condition set for each of the plurality of electric devices and the amount of electric power consumed by each of the plurality of electric devices. The consumption computing section computes an air consumption and an electric power consumption per predetermined period based on the conditions set for the plurality of air driven devices and the conditions set for the plurality of electric devices input from the controller and the individual air consumption information and the individual electric power consumption information stored in the consumption information storage section. The display control section causes the display section to display the air consumption and the electric power consumption computed by the consumption computing section. This configuration makes it possible to display the air consumption and the electric power consumption corresponding to the condition set for each of the plurality of air driven devices and the plurality of electric devices without measurement by measuring devices. Therefore, according to the present invention, it is possible to inform a user of the air consumption and the electric power consumption per predetermined period corresponding to the set conditions without using measuring devices. Then, the user can be informed, through display on the display section, of the air consumption and the electric power consumption per predetermined period for the conditions set by the user himself/herself to check if the set conditions are appropriate. This consequently allows the user to set conditions that reduces the total energy consumption. The predetermined period may arbitrarily be determined. If the predetermined period is set to one molding cycle, for example, the user can more intuitively check if the set conditions are appropriate. The same effect can be obtained if the predetermined period is set to a unit time.

The individual electric power consumption information may include electric power consumption information on a motor as the electric device and electric power consumption information on one or more non-motor electric devices or one or more electric devices other than the motor. In this case, the electric power consumption information on the motor may include at least information on the amount of electric power consumed by the motor when the motor is in an operating state and when the motor is in a stand-by state. The electric power consumption information on the one or more non-motor electric devices may include information on the amount of electric power consumed by the one or more non-motor electric devices when the one or more non-motor electric devices are in an operating state. In the apparatus for taking out a molded product, the motor is either in the operating state or in the stand-by state during one cycle of operation, and consumes electric power even when the motor is in the stand-by state. Meanwhile, the one or more non-motor electric devices consume no electric power or substantially no electric power when the one or more non-motor electric devices are not in the operating state (not turned on). Therefore, the electric power consumption per one cycle can be more precisely calculated through computation, even without using measuring devices, based on the electric power consumption information obtained when the motor is in the operating state and when the motor is in the stand-by state and the electric power consumption information obtained when the one or more non-motor electric devices are in the operating state.

If the individual electric power consumption information includes electric power consumption information on a motor as the electric device and electric power consumption information on one or more non-motor electric devices, the consumption computing section preferably computes the electric power consumption in consideration of information obtained from the motor in the operating state. This configuration makes it possible to accurately determine whether each of the motor and the non-motor electric devices is in the operating state or in the stand-by state, which enhances the accuracy of computation of the electric power consumption.

The consumption computing section preferably executes computation upon termination of operation for each molding cycle. This allows display of more accurate computation air consumption and electric power consumption obtained in consideration of information obtained from the motor in the operating state. Also in this case, the display control section may be configured to cause the display section to continue displaying when a command for display on the display section is given. This configuration allows the air consumption and the electric power consumption, which are displayed according to a change in settings made by the user, to be updated every molding cycle, which allows the user to immediately recognize that the air consumption and the electric power consumption have been reduced or saved.

The consumption computing section may compute instantaneous electric power during operation of the apparatus in synchronization with the operation of the apparatus. In this case, the display control section may be configured to cause the display section to display the instantaneous electric power along with the electric power consumption. This configuration allows the instantaneous electric power to be displayed separately from the electric power consumption which is not changed through operation in one cycle. This allows the user to recognize variations in consumed electric power due to changes in state of each of the electric devices (whether in the operating state or in the stand-by state) through operation in one cycle.

The consumption information storage section may be provided in the controller. This configuration facilitates signal processing for computation. The consumption information storage section may also be provided in the plurality of electric devices. This configuration allows information collected from the plurality of electric devices to be stored in the consumption information storage section, which facilitates collecting information.

The display control section may have the air consumption and the electric power consumption displayed in arbitrary formats. For example, the air consumption and the electric power consumption may be displayed at the same time, or may be displayed separately and alternately. Display of the air consumption and display of the electric power consumption may be switched by an operation made by the user.

In a specific example, the display section may include a display screen. The air consumption, the electric power consumption, and the instantaneous electric power may be displayed on the display screen in arbitrary formats. For example, the display control section may have the air consumption and the electric power consumption, which are obtained for operations in one cycle and thus are not changed during one cycle, displayed in numerical values. Meanwhile, the instantaneous electric power, which is fluctuated in real time, is preferably displayed in a bar graph to allow the user to recognize such fluctuations. This configuration allows fluctuations in air consumption and electric power consumption to be displayed in a quantitative manner, and allows fluctuations in instantaneous electric power to be displayed in an intuitive manner, which provides adequate information to a viewer or user.

The consumption information storage section may be configured to additionally store individual air consumption information on an air driven device newly added to the apparatus and individual electric power consumption information on an electric device newly added to the apparatus. This configuration allows the air consumption and the electric power consumption to be computed by reflecting the addition of any air driven device or electric device to the apparatus. Therefore, a reduction in computation accuracy due to the addition of the air driven device or the electric device can be prevented.

BRIEF DESCRIPTION OF THE DRAWINGS

These and other objects and many of the attendant advantages of the present invention will readily be appreciated as the same becomes better understood by reference to the following detailed description when considered in connection with the accompanying drawings.

FIG. 3 is a table showing the relationship among a plurality of air driven devices, drive sources for the plurality of air driven devices, and accessory units for the drive sources.

FIG. 4A shows individual air consumption information corresponding to conditions set for the respective air driven devices, and FIG. 4B shows the relationship between cylinders and a vacuum generating device and the amount of air consumed in one molding cycle in a normal mode.

FIG. 6A shows an example of individual electric power consumption information on one or more non-motor electric devices stored in an individual electric power consumption information storage section according to the embodiment, FIG. 6C shows an example of electric power consumption information corresponding to a speed command for a motor, and FIG. 6D shows an example of the relationship between the speed command for the motor and electric power consumed in an accelerating state or a decelerating state.

DESCRIPTION OF THE PREFERRED EMBODIMENTS

Figure 1:
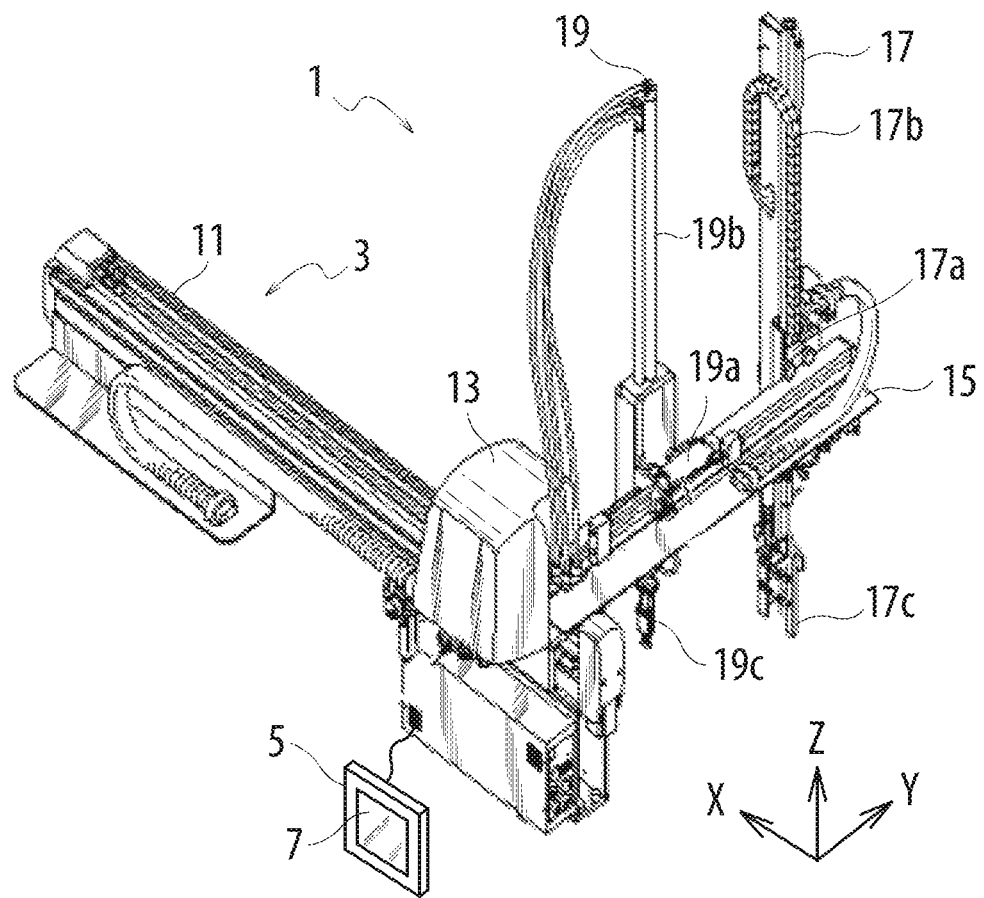
FIG. 1 shows the overall configuration of an apparatus for taking out a molded product.

An apparatus for taking out a molded product according to an embodiment of the present invention will be described in detail below with reference to the drawings. FIG. 1 shows the overall configuration of an apparatus 1 for taking out a molded product according to the embodiment. The apparatus 1 is a traverse-type apparatus for taking out a molded product. A base portion of the apparatus 1 is supported by a fixing platen of a molding device (not shown).

The apparatus 1 shown in FIG. 1 includes a main apparatus 3 and a controller 5. The controller 5 is communicably connected to the main apparatus 3 via a cable. A touch-panel display screen 7 is provided on the front surface of the controller 5. Various images can be displayed on the display screen 7. An operator can change the settings of the main apparatus 3 and the controller 5 by touching the screen 7. While the main apparatus 3 and the controller 5 are communicably connected to each other via a cable in the embodiment, the main apparatus 3 and the controller 5 may be wirelessly communicably connected to each other.

The main apparatus 3 includes a transverse shaft 11, a first transfer body 13, an extraction shaft 15, a molded product-suctioning elevating unit 17, and a runner elevating unit 19. The transverse shaft 11 has a cantilever beam structure in which the transverse shaft 11 extends in the X-axis direction which is horizontal and orthogonal to the longitudinal direction of the molding device (not shown). The first transfer body 13 is supported by the transverse shaft 11 to be advanced and retracted in the X-axis direction by a drive source including a servo motor. The extraction shaft 15 is provided to the first transfer body 13 to extend in the Y-axis direction which is parallel to the longitudinal direction of the molding device.

The molded product-suctioning elevating unit 17 includes a second transfer body 17a and an elevating shaft 17b. The second transfer body 17a is supported by the extraction shaft 15 to be advanced and retracted in the Y-axis direction which is parallel to the longitudinal direction by a drive source including an air cylinder device. The elevating shaft 17b is supported by the second transfer body 17a to be elevated and lowered in the Z-axis direction by a drive source including an air cylinder device. A molded product-suctioning head 17c is provided at an end of the elevating shaft 17b, and driven by a drive source including a vacuum generating device to suction a molded product.

The runner elevating unit 19 includes a third transfer body 19a and an elevating shaft 19b. The third transfer body 19a is supported by the extraction shaft 15 to be advanced and retracted in the Y-axis direction which is parallel to the longitudinal direction by a drive source including an air cylinder device. The elevating shaft 19b is supported by the third transfer body 19a to be elevated and lowered in the Z-axis direction by a drive source including an air cylinder device. A runner chuck 19c is provided at an end of the elevating shaft 19b, and driven by a drive source formed by an air cylinder device to retain a runner. Operation of the apparatus 1 is known in the art, and therefore is not described herein.

Figure 2:
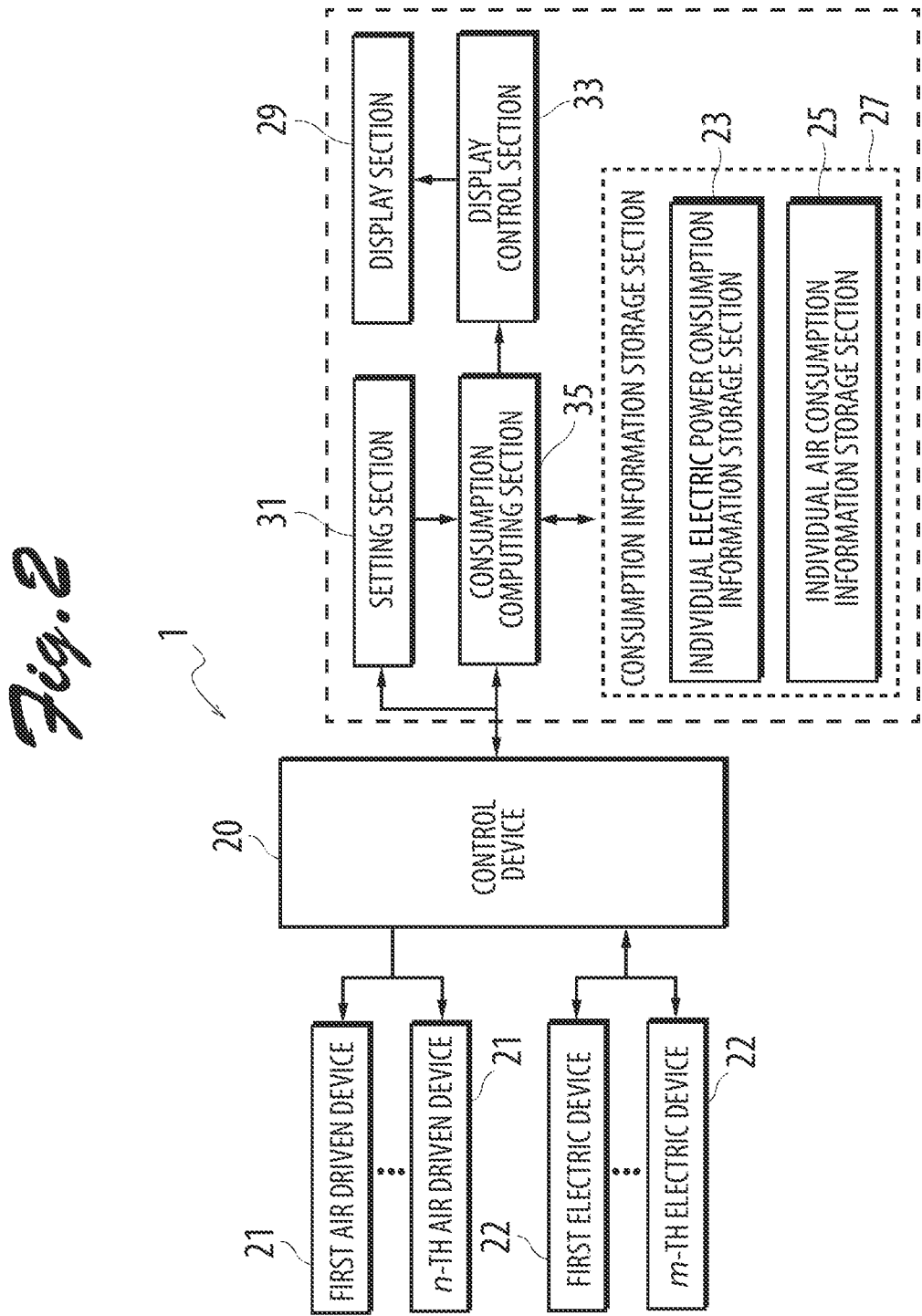
FIG. 2 is a block diagram showing an example of the configuration of a main portion of a signal processing circuit built in a main portion and a controller.

FIG. 2 is a block diagram showing an example of the configuration of a main apparatus of a signal processing circuit built in the main apparatus 3 and the controller 5 of the apparatus 1 according to the embodiment of the present invention which is capable of computing the amount of consumed air and the amount of consumed electric power without using measuring devices. The main apparatus 3 includes first to n-th air driven devices 21 which are driven by air and first to m-th electric devices 22 which are driven by electric power. n and m are each a positive integer. As discussed later, the first to n-th air driven devices 21 include the air cylinder devices and the vacuum generating device serving as drive sources for the second transfer body 17a and the elevating shaft 17b of the molded product-suctioning elevating unit 17 and the third transfer body 19a and the elevating shaft 19b of the runner elevating unit 19. As discussed later, the first to m-th electric devices 22 include various types of motors such as the servo motor serving as the drive source for the first transfer body 13 and various types of one or more non-motor electric devices such as switches for valves that actuate the air cylinder devices and the vacuum generating device. A control device 20 controls operation of the first to n-th air driven devices 21 and the first to m-th electric devices 22 according to conditions set through the controller 5.

The controller 5 includes at least a display section 29 having the display screen 7 (FIG. 1), a setting section 31, a consumption information storage section 27 constituted from an individual electric power consumption information storage section 23 that stores individual electric power consumption information and an individual air consumption information storage section 25 that stores individual air consumption information, a display control section 33, and a consumption computing section 35. The setting section 31 sets the mode of operation, such as an operation to take out a molded product, including conditions set for the plurality of air driven devices and the plurality of electric devices according to an input from a user. The consumption computing section 35 computes the air consumption and the electric power consumption per one molding cycle each time a take-out operation in one molding cycle is finished, based on at least the settings made through the setting section 31, the individual electric power consumption information stored in the individual electric power consumption information storage section 23, and the individual air consumption information stored in the individual air consumption information storage section 25. The consumption computing section 35 also computes the instantaneous electric power during operation of the apparatus 1 in synchronization with the operation of the apparatus 1. The display control section 33 causes the display section 29 to display on the display screen 7 the air consumption, the electric power consumption, and the instantaneous electric power computed by the consumption computing section 35. The display control section 33 according to the embodiment is configured to continue displaying on the display section 29 when a command for display on the display section 29 is given according to the settings made through the setting section 31.

Next, a specific example of computation of the air consumption performed without using measuring devices will be described with reference to FIGS. 3, 4A, and 4B. FIG. 3 is a table showing the relationship among the six air driven devices, drive sources for the six air driven devices, and accessory units for the drive sources, all of which are used in the apparatus 1 according to the embodiment. In the embodiment, as shown in FIG. 3, the second transfer body 17a, the third transfer body 19a, the elevating shaft 17b, the elevating shaft 19b, and the runner chuck 19c, which are driven by air cylinders actuated by valves 1 to 5, respectively, serving as accessory units, and the molded product-suctioning head 17c, which is driven by a vacuum generating device actuated by a valve 6 serving as an accessory unit, are provided as the plurality of air driven devices.

FIG. 4A shows an example of the individual air consumption information stored in the individual air consumption information storage section 25 and corresponding to the conditions set for the respective air driven devices. The individual air consumption information includes a value obtained by measuring in advance the amount of air consumed by each of the air driven devices of the apparatus 1 according to the set conditions. Operation of a cylinder is continued once a corresponding valve is turned on. Therefore, the amount of air consumed by each of the cylinders 1 to 5 is indicated in the unit of the amount of air consumed when the corresponding valve is turned on once. In contrast, in order for a vacuum generating device to maintain a state in which a molded product is suctioned to the suctioning head, it is necessary to have the corresponding valve continuously turned on. Therefore, the amount of air consumed by the vacuum generating device is indicated in the unit of the amount of air consumed while the corresponding valve is turned on for one second. In the embodiment, as shown in FIG. 4A, individual air consumption information on air driven devices (an additional air cylinder 6 and an additional vacuum generating device) that maybe added to the apparatus 1 maybe additionally stored in the individual air consumption information storage section 25.

FIG. 4B shows an example of the relationship between the cylinders and the vacuum generating device and the amount of air consumed in one molding cycle in the normal mode. In the example shown in FIG. 4B, it is assumed that the runner elevating unit 19 (that is, the cylinders 2, 4, and 5) is not used in the molding cycle for ease of illustration. In the example of FIG. 4B, one molding cycle has 12 seconds, during which the valve 1 for the cylinder 1 is turned on twice, the valve 3 for the cylinder 3 is turned on twice, and the valve 6 for the vacuum generating device is turned on twice, each for three seconds and two seconds. The consumption computing section 35 computes the amount of air consumed by each of the air driven devices in one molding cycle. That is, the consumption computing section 35 computes that the vacuum generating device has consumed 10 liters (=(3 seconds+2 seconds)×2 liters) of air. In addition, the consumption computing section 35 computes that the cylinder 1 has consumed 4 liters (=twice×2 liters) of air and the cylinder 3 has consumed 6 liters (=twice×3 liters) of air in one molding cycle. Then, the consumption computing section 35 computes that 20 liters (=10+4+6) of air has been consumed in the entire molding cycle. The display control section 33 causes the air consumption computed by the consumption computing section 35 to be displayed on the display screen 7. In the embodiment, the air consumption per one minute and the air consumption per one cycle (per predetermined period) are displayed. Therefore, the display screen 7 displays an indication of 100 liters/minute (=20 liters×(60÷12)). In addition, the display screen 7 displays an indication of 20 liters, which is the amount of air consumed in one cycle, as the current air consumption. If the runner elevating unit 19 (that is, the cylinders 2, 4, and 5) is used, or if the additional air cylinder 6 or the additional vacuum generating device is added to the apparatus 1 in use, the amount of air consumed by each of the air driven devices in one molding cycle may be calculated in the same manner as in FIG. 4B to be used for computation.

Figure 5:
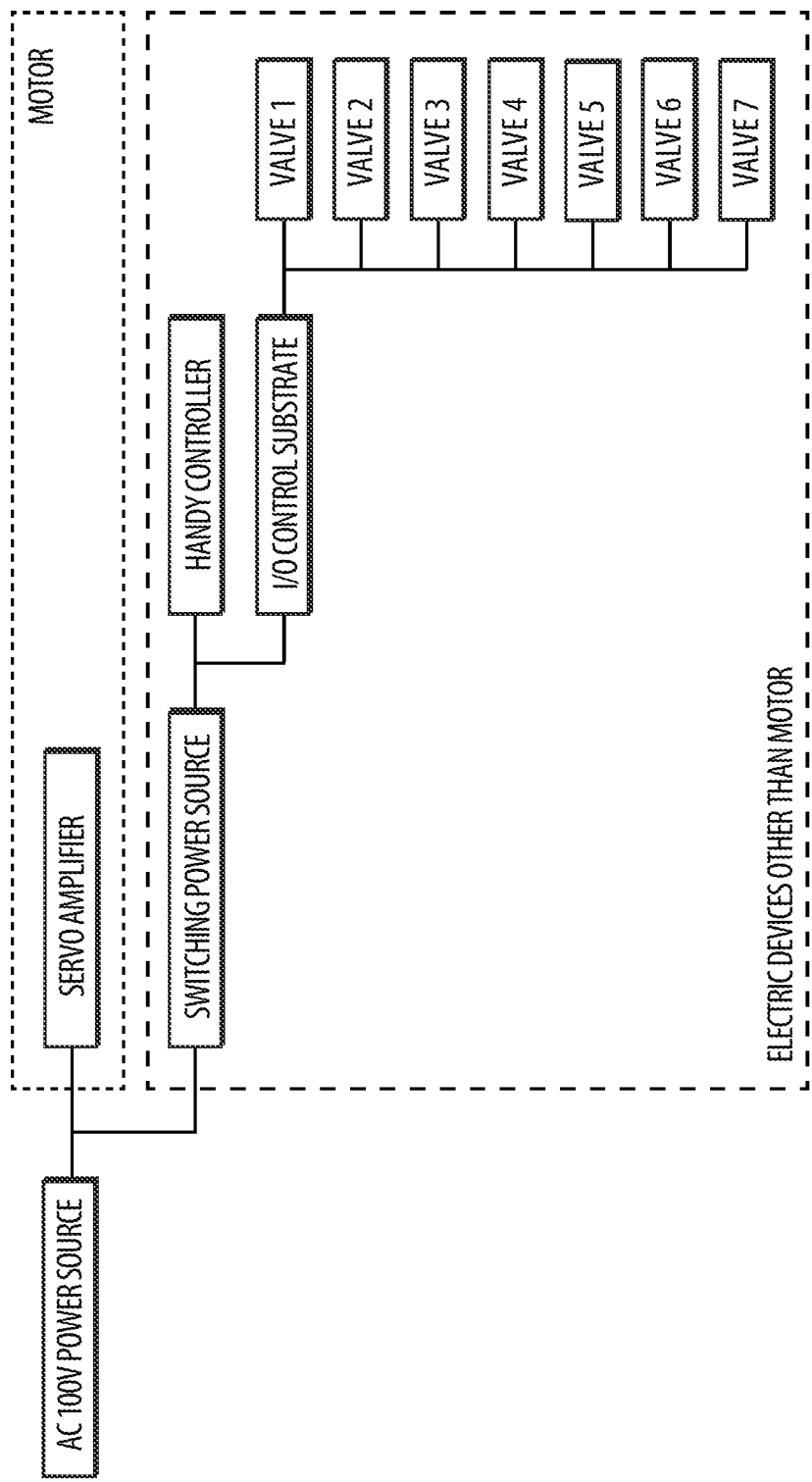
FIG. 5 shows information on a plurality of electric devices used in the apparatus for taking out a molded product according to the embodiment.

A specific example of computation of the electric power consumption performed without using measuring devices will be described. FIG. 5 shows the plurality of electric devices used in the apparatus 1 according to the embodiment connected to an electric power source. In the embodiment, as shown in FIG. 5, the plurality of electric devices used in the apparatus 1 are divided into motor and one or more non-motor electric devices, and the individual electric power consumption information storage section 23 stores electric power consumption information on the motor and electric power consumption information on the one or more non-motor electric devices. The consumption computing section 35 computes the amount of electric power consumed by the motor per one molding cycle and the amount of electric power consumed by the one or more non-motor electric devices per one molding cycle to output the total of the respective amounts as electric power consumption information.

FIG. 6A shows individual electric power consumption information on the one or more non-motor electric devices stored in the individual electric power consumption information storage section 23 according to the embodiment. In the embodiment, the amount of electric power consumed when the apparatus 1 is turned on is defined as "basic electric power consumed when energized", and the amount of electric power additionally consumed when a backlight for the controller 5 is turned on and the respective amounts of electric power additionally consumed when the valves for the air driven devices are turned on are stored as the individual electric power consumption information on the one or more non-motor electric devices in the individual electric power consumption information storage section 23 provided in the controller 5. In the embodiment, individual electric power consumption information on electric devices that can be added to the apparatus 1 can also be additionally stored in the individual electric power consumption information storage section 23. The individual electric power consumption information on each of the electric devices is obtained by measuring in advance the amount of electric power by which the electric power consumption is increased per unit time determined in advance (in the embodiment, per 0.1 second), for example, when the electric device is turned on.

The consumption computing section 35 checks whether or not each of the one or more non-motor electric devices is turned on every unit time determined in advance (every 0.1 second). If any of the one or more non-motor electric devices are turned on, the amount of electric power additionally consumed when the one or more non-motor electric devices are turned on is added to the basic electric power consumed when energized (Pbase) to calculate the instantaneous electric power consumed by the one or more non-motor electric devices. For example, if the backlight and the valve 3 are turned on, the instantaneous electric power is calculated as Pbase+Pbk+Pv3. The consumption computing section 35 computes the instantaneous electric power every unit time determined in advance through one molding cycle and integrates the computed values of the instantaneous electric power to compute the amount of electric power consumed by the one or more non-motor electric devices per one molding cycle.

Figure 6B:
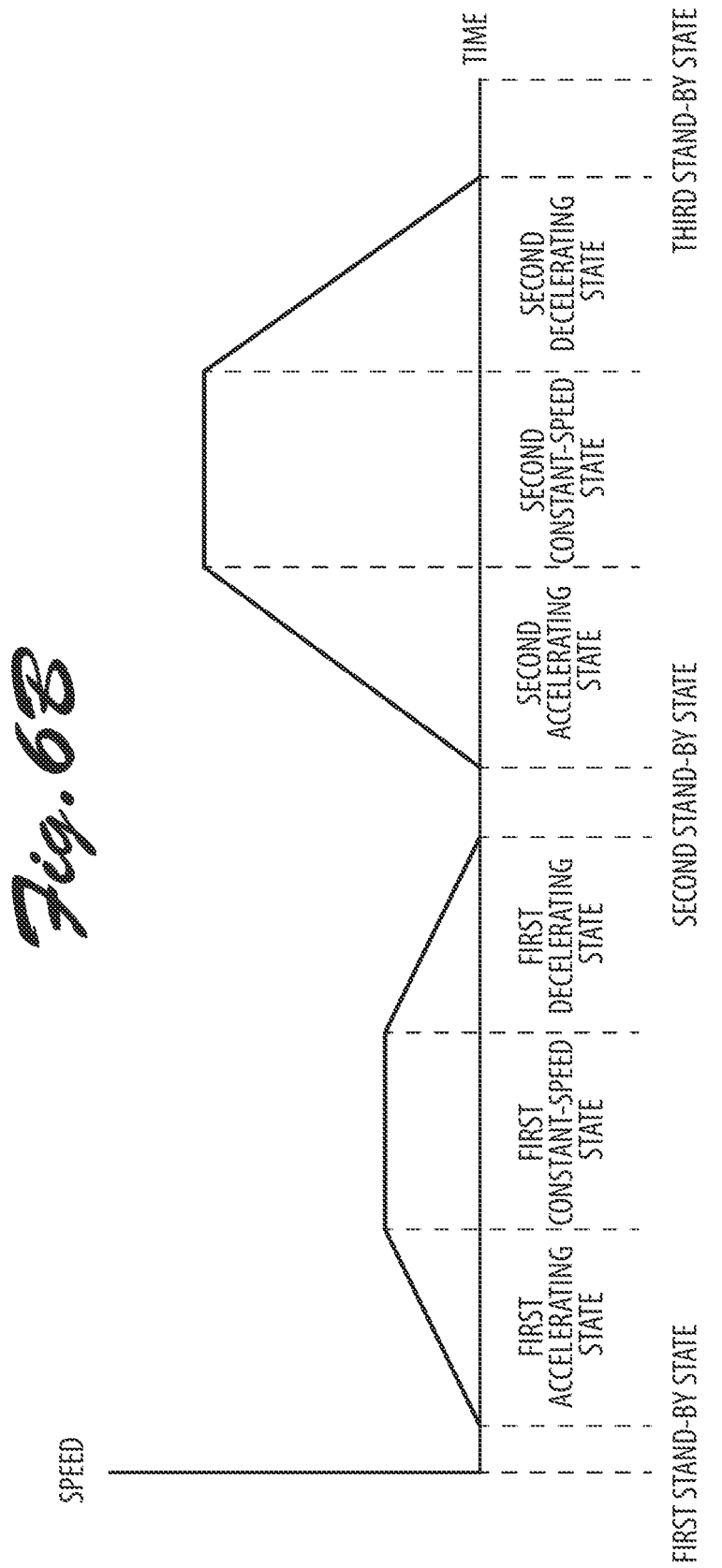
FIG. 6B shows an example of individual electric power consumption information on a motor as an electric device.

Next, a specific example of computation of the amount of electric power consumed by the motor will be described. FIG. 6B shows an example of an operation pattern of the motor used in the embodiment in one cycle. In the example of FIG. 6B, the motor operates in a pattern sequentially including a first stand-by state, a first accelerating state, a first constant-speed state, a first decelerating state, a second stand-by state, a second accelerating state, a second constant-speed state, a second decelerating state, and a third stand-by state. The operation of the motor is determined by a speed command program for speed and acceleration determined in advance. Thus, the individual electric power consumption information storage section 23 according to the embodiment stores electric power consumption information corresponding to a speed command that determines the speed of the motor. FIG. 6C shows an example of the electric power consumption information corresponding to the speed command for the motor. In the first to third stand-by states, the electric power consumption per unit time is not changed, and thus the electric power consumption Pwa in the first to third stand-by states has a fixed value. Likewise, in the first and second constant-speed states, the amount of electric power consumed by the motor per unit time is not changed, and thus the electric power consumption Pnr1 in the first constant-speed state and the electric power consumption Pnr2 in the second constant-speed state have respective fixed values. In the first accelerating state, in contrast, the amount of electric power consumed by the motor is changed by variations in speed of the motor. Likewise, in the first decelerating state, the second accelerating state, and the second decelerating state, the amount of electric power consumed by the motor is changed by variations in speed of the motor. Thus, the electric power consumption Pac1 consumed in the first accelerating state, the electric power consumption Pac2 in the first decelerating state, the electric power consumption Pac3 in the second accelerating state, and the electric power consumption Pac4 in the second decelerating state are fluctuated according to the speed of the motor. The individual electric power consumption information storage section 23 stores the respective electric power consumption corresponding to the speed command for the motor. FIG. 6D shows the relationship between the speed command for the motor and the electric power consumption Pac1 in the first accelerating state as an example of relationship between the speed command for the motor and the electric power consumption in an accelerating state or in a decelerating state.

The consumption computing section 35 first resets the integrated electric power value to 0 when one molding cycle is started. Then, the consumption computing section 35 checks in which of the operation states and the stand-by states the motor is, every unit time determined in advance, that is, every 0.1 second. If the motor is in any of the first to third stand-by states, the consumption computing section 35 adds the value of Pwa as the instantaneous amount of consumed electric power (instantaneous electric power) to the integrated electric power value. If the motor is in the first constant-speed state, the consumption computing section 35 adds the value of Pnr1 to the integrated electric power value. If the motor is in the second constant-speed state, the consumption computing section 35 adds the value of Pnr2 to the integrated electric power value.

If the motor is in the first accelerating state, the consumption computing section 35 adds a value of the instantaneous amount of consumed electric power (instantaneous electric power) corresponding to the speed of the motor to the integrated electric power value. If the speed is v2, for example, the consumption computing section 35 adds the electric power consumption Pac1-2 to the integrated electric power value. If the motor is in the first decelerating state, the second accelerating state, or the second decelerating state, the consumption computing section 35 adds the electric power consumption Pac2, Pac3, or Pac4 corresponding to the speed of the motor to the integrated electric power value. The consumption computing section 35 computes the instantaneous electric power every unit time determined in advance through one molding cycle and integrates the computed values of the instantaneous electric power to compute the amount of electric power consumed by the one or more non-motor electric devices per one molding cycle. In the embodiment, the resulting integrated electric power value is divided by the time of one molding cycle when one molding cycle is completed to compute the amount of electric power consumed by the motor (average electric power consumption).

The method of computing the electric power consumption without using measuring devices is not limited to that described above. If electric power consumption information on a motor as the electric device and electric power consumption information on one or more non-motor electric devices are separately stored as individual electric power consumption information as in the embodiment, the consumption computing section 35 preferably computes electric power consumption information in consideration of information obtained from the motor in the operating state (such as actual operation time and information on electric power regeneration). This configuration makes it possible to accurately determine whether each of the motor and the one or more non-motor electric devices are in the operating state or in the stand-by state, which enhances the accuracy of computation of the electric power consumption. In this case, it is a matter of course that a part of the individual electric power consumption information storage section 23 may be constituted from a storage unit provided in a motor drive device.

The consumption computing section 35 preferably executes computation upon termination of operation for each molding cycle. This allows display of more accurate computation air consumption and electric power consumption obtained particularly in consideration of information obtained from the motor in the operating state. Also in this case, the display control section 33 may be configured to cause the display section 29 to continue displaying when a command for display on the display section 29 is given. This configuration allows the air consumption and the electric power consumption, which are displayed according to a change in settings made by the user, to be updated every molding cycle, which allows the user to immediately recognize that the air consumption and the electric power consumption have been reduced.

The consumption computing section 35 adds the computed amount of electric power consumed by the motor and the computed amount of electric power consumed by the one or more non-motor electric devices to compute the amount of electric power consumed by the apparatus 1. In addition, the consumption computing section 35 adds the computed instantaneous electric power consumed by the motor and the computed instantaneous electric power consumed by the one or more non-motor electric devices to compute the instantaneous amount of electric power consumed by the apparatus 1. If an additional air cylinder or an additional motor device is added to the apparatus 1 in use, the amount of electric power consumed by each electric device in one molding cycle may be calculated for addition in the same manner as in FIGS. 5, 6A, and 6B.

Figure 7:
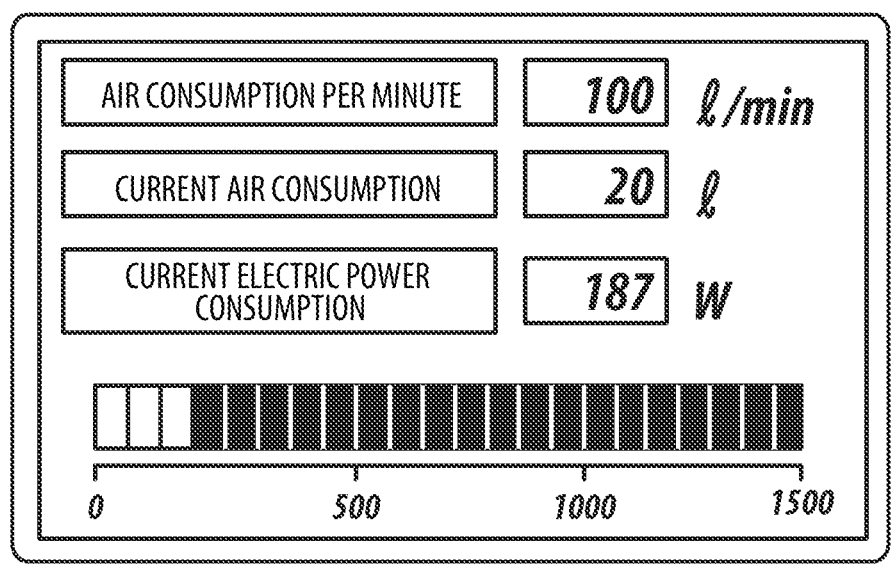
FIG. 7 shows an example of an image that a display control section causes a display section to display on a display screen based on an air consumption and an electric power consumption computed by a consumption computing section.

FIG. 7 shows an example of an image that the display control section 33 causes the display section 29 to display on the display screen 7 based on the air consumption and the electric power consumption computed by the consumption computing section 35. In the example of FIG. 7, the air consumption and the electric power consumption are displayed in numerical values at the same time, and the instantaneous electric power is displayed in a bar graph. The air consumption and the electric power consumption may not necessarily be displayed at the same time.

While certain features of the invention have been described with reference to example embodiments, the description is not intended to be construed in a limiting sense. Various modifications of the example embodiments, as well as other embodiments of the invention, which are apparent to persons skilled in the art to which the invention pertains, are deemed to lie within the spirit and scope of the invention.

What is claimed is:

1. An apparatus for taking out a molded product, comprising:
    a plurality of air driven devices driven by air;
    a plurality of electric devices driven by electric power;
    a controller including a display section and configured to set respective operating conditions of the devices of the apparatus;
    a consumption information storage section configured to store individual air consumption information and individual electric power consumption information, the individual air consumption information being related to a relationship between the condition set for each of the plurality of air driven devices and the amount of air consumed by each of the plurality of air driven devices, and the individual electric power consumption information being related to a relationship between the condition set for each of the plurality of electric devices and the amount of electric power consumed by each of the plurality of electric devices;

a consumption computing section configured to compute an air consumption and a electric power consumption per predetermined period based on the conditions set for the plurality of air driven devices and the conditions set for the plurality of electric devices input from the controller and the individual air consumption information and the individual electric power consumption information stored in the consumption information storage section; and a display control section configured to cause the display section to display the air consumption and the electric power consumption computed by the consumption computing section.

2. The apparatus for taking out a molded product according to claim 1, wherein
the predetermined period is one molding cycle.

3. The apparatus for taking out a molded product according to claim 1, wherein:
the individual electric power consumption information includes electric power consumption information on a motor as the electric device and electric power consumption information on one or more non-motor electric devices;
the electric power consumption information on the motor includes at least information on the amount of electric power consumed by the motor when the motor is in an operating state and when the motor is in a stand-by state; and
the electric power consumption information on the one or more non-motor electric devices includes information on the amount of electric power consumed by the one or more non-motor electric devices when the one or more non-motor electric devices are in an operating state.

4. The apparatus for taking out a molded product according to claim 3, wherein
the consumption computing section computes the electric power consumption further in consideration of information obtained from the motor in the operating state.

5. The apparatus for taking out a molded product according to claim 4, wherein:
the consumption computing section executes computation upon termination of operation for each cycle; and
the display control section causes the display section to continue displaying when a command for display on the display section is given.

6. The apparatus for taking out a molded product according to claim 1, wherein:
the consumption computing section computes instantaneous electric power during operation of the apparatus in synchronization with the operation of the apparatus; and
the display control section causes the display section to display the instantaneous electric power along with the electric power consumption.

7. The apparatus for taking out a molded product according to claim 1, wherein
the consumption information storage section is provided in a distributed manner in the controller and at least one of the plurality of electric devices.

8. The apparatus for taking out a molded product according to claim 1, wherein
the display control section causes the display section to display the air consumption and the electric power consumption at the same time as or separately from each other.

9. The apparatus for taking out a molded product according to claim 1, wherein:
the display section includes a display screen; and
the display control section causes the display screen to display the air consumption and the electric power consumption in numerical values and to display the instantaneous electric power in a bar graph.

10. The apparatus for taking out a molded product according to claim 1, wherein
the consumption information storage section is configured to additionally store individual air consumption information on an air driven device newly added to the apparatus and individual electric power consumption information on an electric device newly added to the apparatus.

* * * * *